Feb. 24, 1948.   W. E. NICHOLOY   2,436,594
ROOT HARVESTER AND STEERING MEANS THEREFOR
Filed Nov. 5, 1943   3 Sheets-Sheet 3
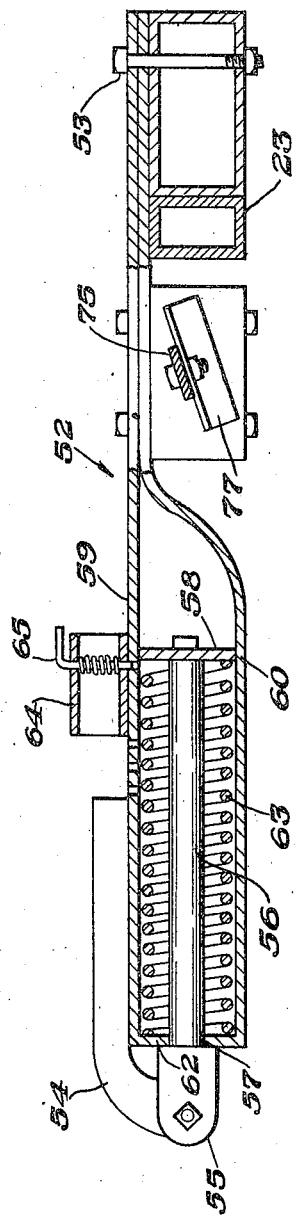
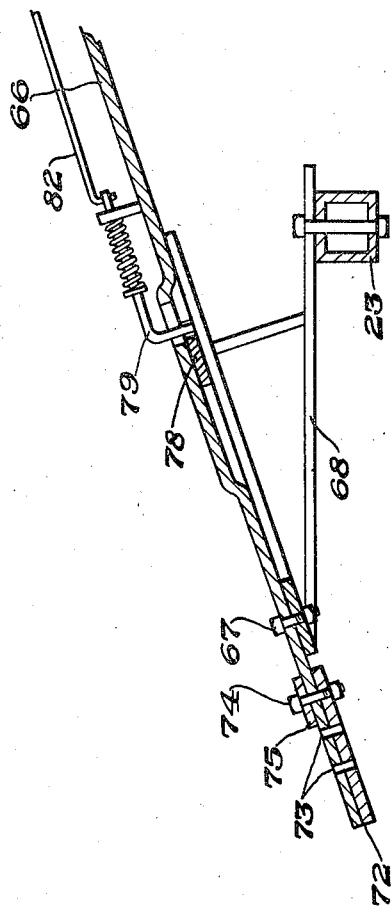
INVENTOR
Winford E. Nicholoy
BY
Warren H. F. Schmieding
ATTORNEY Patented Feb. 24, 1948

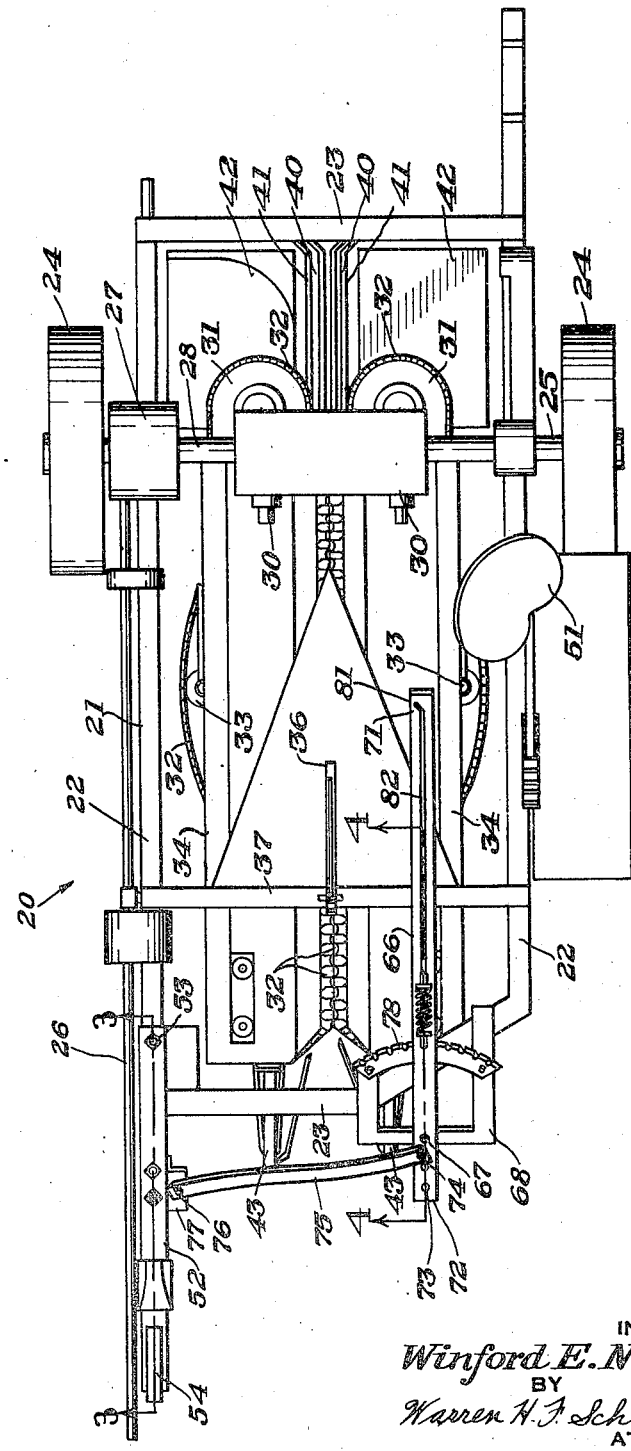

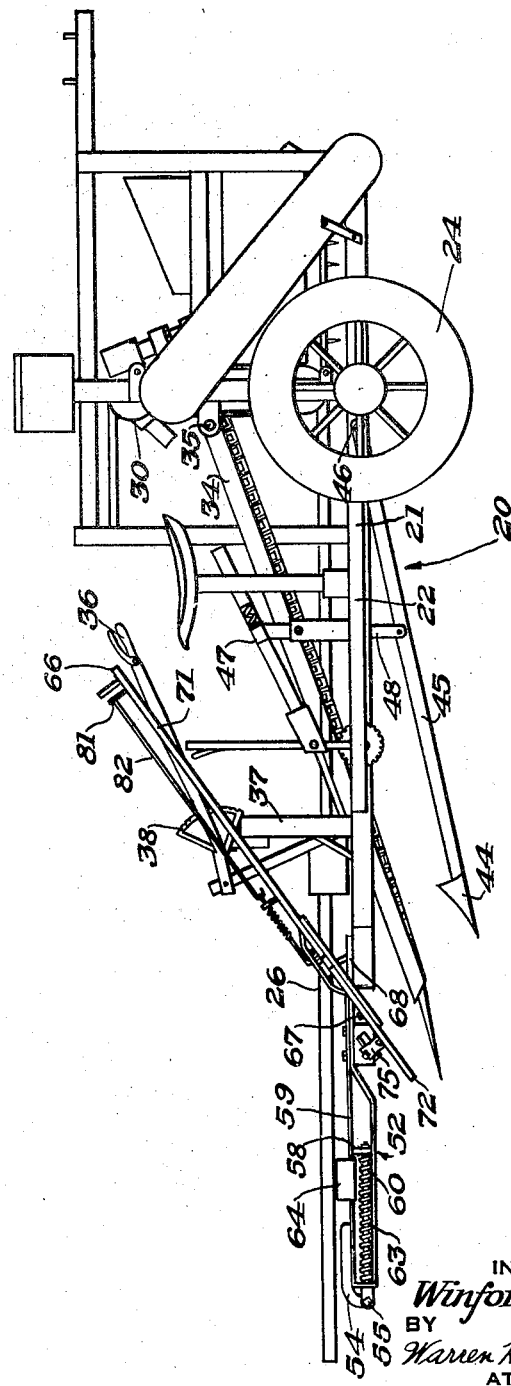

2,436,594

UNITED STATES PATENT OFFICE 2,436,594

ROOT HARVESTER AND STEERING MEANS THEREFOR

Winford E. Nicholoy, Columbus, Ohio, assignor to The Scott Viner Company, Columbus, Ohio, a corporation of Ohio Application November 5, 1943, Serial No. 509,054

2 Claims. (Cl. 55—108)

This invention relates to farm machinery and is particularly directed to apparatus for harvesting crops of the type which are planted in rows.

An object of this invention is to provide a harvester which is adapted to be drawn over the fields by a tractor or other automotive vehicle and which is provided with improved means for causing the harvester to more accurately follow the row being harvested and thus prevent the destruction or loss of produce.

Another object of the invention is to provide a harvester having a drawbar adjustably connected thereto and providing a device by which the operator of the harvester may adjust the drawbar in order that the harvester will closely follow a selected row of crops irrespective of whether the tractor changes its relation to that row.

A further object is to provide a farm implement having a frame to which a drawbar is pivotally connected, the frame also having an adjusting device for the drawbar whereby the relation between the frame and the drawbar may be changed as occasion arises, means being provided to maintain the setting of the adjusting device and the drawbar.

A still further object is to provide a harvester, particularly for crops of the edible root type, which is provided with root lifting and conveying mechanism which must be registered with and moved along the rows in the root harvesting operation, means being provided to facilitate the act of registering the lifting and conveying mechanism with the rows during the movement of the harvester over the fields, the latter means including an adjusting device which is employed to transmit movement to the connecting means between the harvester and the tractor whereby the harvester will be guided laterally relative to the tractor until the lifting mechanism accurately registers with the selected row.

Further objects and advantages of the present invention will be apparent from the following description, reference being had to the accompanying drawings wherein a preferred form of embodiment of the invention is clearly shown.

In the drawings:

Fig. 1 is a plan view of a farm implement formed in accordance with the present invention;

Fig. 2 is a side elevational view of the implement;

Fig. 3 is a detail vertical longitudinal sectional view taken on the plane indicated by the line 3—3 of Fig. 1 and shows the drawbar which is employed in connecting the implement to a draft vehicle; and Fig. 4 is a view taken on the plane indicated by the line 4—4 of Fig. 1.

Referring more particularly to the drawing, the numeral 20 designates the farm implement in its entirety. This implement has been illustrated as a beet harvesting device. However, the invention is equally applicable to various other implements which may be drawn by a tractor or other draft vehicle.

The machine 20 includes a main frame 21 which is substantially rectangular when viewed in top plan and includes longitudinally extending side members 22 connected at their ends by transversely extending members 23. Adjacent the rear end of the frame 21, there is provided a pair of ground engaging wheels 24 which are mounted on an axle device 25. At one side, the frame is provided with a power transmitting shaft 26 which may be connected with the power take-off, not shown, of a tractor. The shaft 26 extends rearwardly on the frame to a point adjacent the wheels where it connects with a transmission 27, which conducts motion from the shaft 26 to an elevated transversely extending shaft 28. At points adjacent the vertical center of the machine 20, the shaft 28 is connected with dual transmissions 30—30 which are employed to transmit the rotation of the shaft 28 to a pair of laterally spaced sprockets 31—31. The sprockets 31 receive endless chains 32 which extend longitudinally of the machine around tensioning members 33 and other idler sprockets, not shown, which are carried by a conveyor frame 34 extending from the front portion of the machine toward the rear in an upwardly inclined direction. This conveyor frame 34 is pivoted to the main frame as at 35 in order that it may be raised or lowered through the manipulation of an adjusting handle 36 which is pivotally mounted on a raised portion 37 of the machine frame. A suitable quadrant 38 is mounted on the frame member 37 for use in maintaining the handle 36 in its adjusted position and consequently the vertical position of the frame 34.

The idler sprockets on the frame 34 are so arranged that the chains 32 will include a pair of longitudinally extending runs located in closely abutting relation, these runs being disposed substantially at the longitudinal center of the machine. Suitable resilient members, not shown, are provided to permit the chains to be urged into yieldable engagement with one another or with the beets or other articles harvested by the machine. These chains serve to lift the beets or other produce from the ground and convey the same rearwardly and upwardly in the machine to a top severing device 40 located adjacent the rear portion of the machine 20. This top severing device includes two sets of longitudinally extending bars 41, the bars of each set being disposed for rotation about a common axis. At one point in their rotation, corresponding bars of the sets so closely approach one another as to sever the tops of the beets or other articles disposed between the same. The direction of rotation of the bars is such that the tops and leaves will be moved upwardly, rearwardly and outwardly to be discharged over shields 42 arranged on the frame at the sides of the severing device. After the severing operation, the beets fall onto a conveyor, not shown, which transfers the beets to a hopper or other collector.

The forward ends of the lifting and conveying mechanism, frame sections 34, are provided with forwardly and downwardly directed leaf lifting devices 43, these devices projecting beyond the lift chains a considerable distance and serving to elevate and bunch the leaves of the beets in order that they may be grasped by the chains 32. In the operation of the harvesting machine, the leaf lifting devices 43 must be symmetrically located with respect to the row being harvested so that the leaves and tops may be firmly grasped by the chains 32 and the beets lifted vertically out of the ground. This lifting operation is facilitated by loosening the earth around the beets with a small plow share 44, which is carried beneath the lifting mechanism on a lever system 45 also pivoted to the frame 21 as at 46. This lever system is also vertically adjustable, through the manipulation of a handle 47 connected to the lever system by a link 48, for the purpose of varying the depth of the plow 44 in the earth. As the harvesting machine moves over the field, the plow 44 will break up and loosen the earth around the beets or other roots being harvested and thereby make the lifting operation more easily accomplished.

During the operation of the machine, an operator occupies a seat 51, located on the left side of the machine within reach of the levers or handles 36 and 47. As the operator sits in the seat 51, he can observe the positions of the leaf lifting devices and the chains 32 with respect to the row and in the event there is a misalignment of the chains 32 with the row, he can, through the manipulation of the apparatus about to be described, correct this misalignment.

As shown in the drawings, the frame 21 is provided at its forward end with a drawbar 52. This member is pivotally connected, for horizontal movement, at its rear end, as at 53, to the frame 21. The forward end of the drawbar (see Fig. 3) includes an arm 54 which is pivoted to a clevis 55 carried by a rod 56 disposed for sliding movement in an opening 57 formed near the forward end of the drawbar. The rear end of the rod 56 is connected to a plate 58 disposed for sliding movement between upper and lower strips 59 and 60 which form part of the drawbar. The front end of these strips 59 and 60 are joined by an end piece 62. A coil spring 63 is interposed between the end piece 62 and the plate 58 to yieldably resist forward movement of the plate 58 and absorb shocks incident to starting the pulling in the operation of the machine. When the machine is to be connected to the tractor, the lever 54 is swung about its pivot and inserted in a link carried by the tractor. It is then swung to the position shown in Fig. 3 and a keeper device 64, slidably mounted on the top strip of the drawbar, is moved forward to a position wherein the rear end of the arm 54 is restrained against swinging movement. A spring pressed pin 65 retains the keeper in its positions of adjustment. After being so connected, movement of the tractor over the ground will be imparted to the harvesting machine.

In some instances, especially where crops are being produced in sloping fields, it is difficult to keep the tractor in a definite relation to a selected row. The particular drawbar arrangement, shown herein, has been designed to facilitate sufficient limited guiding movement of the harvester to maintain the relation of the leaf lifting devices and the lifting chains with the selected row. To perform this operation, the drawbar is pivotally connected with the harvesting machine frame 21 as previously described and means are provided on the harvester to adjust the relative position of the drawbar and the harvester. This means includes an adjusting lever 66 which is mounted for pivotal movement as at 67 on a bracket 68 secured to the forward portion of the frame 21 near the left side. The bracket is inclined to locate the upper operating end 71 adjacent the seat 51. At the lower end 72, the lever 66 is provided with a plurality of holes 73 for the reception of a bolt 74 employed to pivotally connect one end of a link 75 to the lever 66. The opposite end of this link is pivotally connected as at 76 to an angle bracket 77 which is secured through any suitable means to the side of the drawbar in front of the frame 21. Thus, by grasping the rear end of the lever 66 and swinging the same about its pivot 67, movement may be transmitted to the drawbar and since it is pivoted at 53, the angular relation of the drawbar to the machine frame 21 is varied. Thus, the relative tracking relation of the tractor and harvester can be varied. If the chains 32 are disposed toward one side of the row being harvested, the operator may align the chains with the row by grasping the lever 66 and swinging it in the proper direction. To maintain this adjustment, the bracket 68 has been provided with a notched quadrant 78 for engagement by a spring pressed pin 79 mounted on the lever 66. This spring pressed pin 79 is actuated by a control 81 disposed at the upper end of the handle 66 and connected by a wire 82 with one end of the pin 79. By moving the control 81 rearwardly, the pin may be disengaged from the quadrant to permit the lever 66 to be moved and after the desired adjustment has been made, the control may be released whereupon the pin 79 will be returned to a locking position by its spring. The ratio of movement between the lever 66 and the drawbar may be varied by moving the connection 74 to the other holes in the lever 66. Thus, where greater movement is required, the connection 74 may be moved farther away from the pivot 67.

While the form of embodiment of the present invention as herein disclosed constitutes a preferred form, it is to be understood that other forms might be adopted, all coming within the scope of the claims which follow.

I claim:

1. A root harvester comprising in combination a two wheeled vehicle including a main frame; two laterally disposed wheels carrying the frame adjacent the rear end thereof; a manually adjustable plow share pivotally connected to the main frame and disposed to project into the ground at the forward end of the main frame; a manually adjustable conveyor frame pivotally connected to the main frame; a rearwardly and upwardly extending root lifting and conveyor means mounted on said conveyor frame and having the forward end thereof disposed near the ground at the forward end of the main frame; a draw bar adjacent to the root conveyor means and pivotally attached to the forward end of the main frame, the free end of the draw bar extending forwardly and having means for connecting the same to a draft means and said draft means and said two wheels constituting the entire support of the main frame; and a manually adjustable lever pivotally connected to the forward end of the main frame for adjusting the relative position of the forward end of the draw bar and the main frame around a vertical pivotal axis so that the adjusting lever moves the forward end of the draw bar laterally relative to the frame.

2. A root harvester comprising in combination a two wheeled vehicle including a main frame; two laterally disposed wheels supporting the rear end of the main frame; a driver's seat; a plow share pivotally connected to the main frame and disposed to project into the ground adjacent to the forward end of the main frame; a manually adjustable and rearwardly extending root lifting conveyor means pivotally connected to the main frame and having the forward end thereof disposed near the ground adjacent to the forward end of the main frame; a draw bar pivotally attached to the forward end of the main frame, the free end of the draw bar extending forwardly and having means for connecting the same to a draft means; means for manually adjusting the plow share vertically and for locking it in the adjusted position; and means comprising a lever positioned adjacent to the driver's seat for manually adjusting the relative position of the forward end of the draw bar and the main frame around a vertical pivotal axis so that the adjusting means moves the position of the forward end of the draw bar laterally relative to the main frame to provide for maintaining said root lifting conveyor means in an aligned position with the rows of roots being harvested.

WINFORD E. NICHOLOY.

REFERENCES CITED

The following references are of record in the file of this patent:

UNITED STATES PATENTS

| Number | Name | Date |
| --- | --- | --- |
| 499,782 | Farrall | June 20, 1893 |
| 1,099,414 | Williams | June 9, 1914 |
| 1,403,929 | Welton | Jan. 17, 1922 |
| 1,193,746 | Winters | Aug. 8, 1916 |
| 1,775,149 | Urschel | Sept. 9, 1930 |

FOREIGN PATENTS

| Number | Country | Date |
| --- | --- | --- |
| 11,079 | Denmark | July 20, 1908 |